United States Patent [19]

Koerner et al.

[11] 4,452,961

[45] Jun. 5, 1984

[54] PROCESS FOR THE SYNTHESIS OF HEAT-CURABLE SILICONE RESINS

[75] Inventors: Götz Koerner, Essen; Manfred Priesch, Recklinghausen; Harald Rau; Eckehard Schamberg, both of Essen, all of Fed. Rep. of Germany

[73] Assignee: Th. Goldschmidt AG, Essen, Fed. Rep. of Germany

[21] Appl. No.: 482,955

[22] Filed: Apr. 7, 1983

[30] Foreign Application Priority Data

Apr. 22, 1982 [DE] Fed. Rep. of Germany ....... 3214984

[51] Int. Cl.$^3$ .............................................. C08G 77/06
[52] U.S. Cl. ...................................... 528/26; 524/588; 524/783; 528/17; 428/447
[58] Field of Search ................... 528/26, 17; 428/447; 524/588, 783

[56] References Cited

U.S. PATENT DOCUMENTS

| | | | |
|---|---|---|---|
| 3,044,979 | 7/1962 | Saville .................. | 525/466 |
| 3,044,980 | 7/1962 | Modic et al. .......... | 525/466 |
| 4,035,332 | 7/1977 | Gomyo et al. ........ | 524/761 |
| 4,069,178 | 1/1978 | Mikami et al. ....... | 524/588 |
| 4,331,797 | 5/1982 | Martin .................. | 528/26 |
| 4,408,031 | 10/1983 | Holtschmidt et al. ... | 528/26 |

*Primary Examiner*—Melvyn I. Marquis
*Attorney, Agent, or Firm*—Toren, McGeady and Stanger

[57] ABSTRACT

The invention relates to a process for heat-curable silicone resins and their synthesis by reacting a low molecular weight alkoxysilane with a low molecular weight polyol with 2 to 6 hydroxyl groups in the molecule. The reaction products have a very low viscosity, which is suitable for processing when about 20% of solvent, based on the non-volatile resin, are added.

12 Claims, No Drawings

PROCESS FOR THE SYNTHESIS OF HEAT-CURABLE SILICONE RESINS

BACKGROUND OF THE INVENTION

1. Field of the Invention

The invention relates to a process for the synthesis of a heat-curable silicone resin which is soluble in organic solvents, by partially reacting an alkoxysiloxane with an at least difunctional, low molecular weight polyol, especially in the presence of a catalyst.

2. Description of the Prior Art

German Offenlegungsschrift No. 28 28 990 discloses a process for synthesizing heat-curable silicone resins by reacting alkoxysiloxanes with polyfunctional, organic hydroxyl compounds. In this process, siloxanes, having the general formula

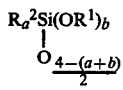

in which
OR$^1$ is an alkoxy group of primary or secondary alcohols with 1 to 4 carbon atoms,
R$^2$ is an alkyl and/or phenyl group,
a has a value of 1.0 to 1.5 and
b has a value of 0.1 to 0.7,
are reacted with low molecular weight, multihydric alcohols at temperatures of 100° to 160° C. Optionally, the reaction is carried out in the presence of known transesterification catalysts and solvents. The alcohol R$^1$OH is removed in a quantitative ratio, such that one SiOR$^1$-group corresponds approximately to one COH-group and the reaction is terminated at a degree of conversion of 25 to 80% by cooling to a temperature below 100° C.

In this reaction, the OR$^1$-groups are methoxy, ethoxy, n-propoxy or isopropoxy or n-butoxy groups. The low molecular weight multihydric alcohols used can be ethylene glycol, trimethylolethane, trimethylolpropane, neopentyl glycol, glycerin, pentaerythritol, dimethylolcyclohexane as well as mixtures thereof.

The cured silicone resins prepared by this process have a very high silicone content of 63 to almost 98% by weight and therefore, have high thermal stability and good elasticity. These products can also be processed in the presence of relatively small amounts of solvents. However, because of their high silicone content, these products are thermoplastic, so that they cannot be used for baked enamels which have to be stable at high temperatures, such as, for example, decorative coatings on household utensils.

Suggestions have been made for combining the desirable enamel properties of polyester resins, especially their high surface hardness, low thermoplasticity and good chemical resistance, with the good properties of the silicone resins, especially their high thermal stability.

U.S. Pat. No. 3,044,979 discloses silicon-containing polyesters which are synthesized from 70 to 95 weight percent of a mixed hydrolysate of chloro-organosilanes with 1.0 to 1.75 organic groups per silicon atom and 30 to 5 weight percent of a polyester with a viscosity of 38,000 to 42,000 cP, which consists of lower alkyl esters of isophthalic acid, terephthalic acid or their mixtures, and ethylene glycol and a saturated, multihydric alcohol with at least 3 OH-groups in the molecule. The products also have a very high thermoplasticity, especially at high silicone contents. In addition, a non-volatiles content of more than 50% in the vehicle solution is difficult to obtain in practice because of the high viscosities.

Silicone resins, modified with polyesters and having a high flexibility and swedging capability, are described in German Auslegeschrift No. 22 32 419. In the process disclosed therein, saturated polyesters are used with a hydroxyl number of 60 to 350 and polysiloxane blocks, which have 0.25 to 0.70 moles of SiOR-groups per 100 g, in a molar ratio of 1.25 to 0.8 relative to the reactive groups. However, the thermostability of these resins is inadequate at silicone contents below 50 percent. It is a serious disadvantage of these modified silicone resins that they require considerable amounts of solvent in order to adjust the viscosity to values required for processing.

German Offenlegungsschrift No. 25 21 170 discloses silicone/polyester copolymers, which are intended to be particularly useful for coating applications. The process for their preparation is characterized by heating a reaction mixture of a silane hydrolysate and a polyester, rich in hydroxyl groups, in the presence of a glycol ether acylate of a carboxylic acid. It is stated in this Offenlegungsschrift that the product of this process generally consist of about 70 to 95% silicone, the rest being polyester. A copolymer which contains, for example, 85.5% silicone and 12.5% polyester, is most preferred. With such a composition, these products are not very suitable for thermostable, decorative enamel finishes because of their high thermoplasticity. It is furthermore pointed out in German Offenlegungsschrift No. 25 21 170 that, in contrast to the process of U.S. Pat. No. 3,044,980, in which the polyester is used without solvents in the copolymerization, solvents from the group of glycol ether acylates can be used to advantage. In this connection, a solids content of about 55 to 65% is recommended. For this reason, these products are also not suitable for coatings, which save energy and raw materials and which are compatible with the environment.

Finally, German Offenlegungsschrift No. 29 49 725 discloses a process for synthesizing polyesters modified with organo(poly)siloxanes by reacting branched organo(poly)siloxanes, containing silicon-linked alkoxy groups with polyesters, containing alcoholic hydroxyl groups. The polyesters are produced from carboxylic acids and/or their anhydrides and or their esters, which contain at least two carboxyl groups per molecule and are free of aliphatic multiple bonds, and alkanols and alcohol, containing 1 to 4 carbon atoms and having at least two hydroxyl groups per molecule as the only reactants used for producing the polyester. Characteristically, an organo(poly)siloxane is used as the branched organo(poly)siloxane containing silicon-linked alkoxy groups at least 95% of whose SiC-linked organic radicals consist of methyl radicals, of which only one radical in each case is linked to a silicon atom. The alkoxy groups of the siloxane consist of methoxy groups, ethoxy groups, or mixtures of these alkoxy groups, and contain at most 0.5 weight percent of silicon-linked hydroxyl groups and, after ashing, at least 40 weight percent of silica based on the weight of the respective organo(poly)siloxane before ashing. These alkoxysilanes are reacted with conventional, saturated polyesters having hydroxyl groups. The polyesters used in this reaction, are of such high molecular weight, that they must be diluted to a solids content of about 60%, in order to adjust the viscosity to a value suitable for the reaction with the alkoxysiloxane. The products of the process are suitable for coating, for example, wood, organopolysiloxane elastomers, or aluminum, and as an adhesive for mica, glass fiber, rock wool, magnesium oxide or silica. The products are especially useful in the manufacture of electrically insulating materials, but not for producing coatings which are resistant to thermal stresses.

Thus, the reaction between alkoxy-functional organosiloxanes and polyesters, containing hydroxyl groups, is well known. Some of the products obtained can be used as enamels. In this connection, however, the modified silicone resins generally have such a high viscosity, that it is not possible to exceed solids contents of 60% by significant amounts.

SUMMARY OF THE INVENTION

We have discovered heat-curable, modified silicone resins, which have such a low viscosity, that only slight amounts of solvent are required in order to reach the processing viscosity. If possible, the desired silicone resins should not require more than 20% of solvent in order to adjust the viscosity to the value required for processing. At the same time, however, the desirable properties of the modified silicone resins are retained.

More particularly, we have discovered that such resins can be prepared by reacting:

(a) an alkoxysiloxane having the formula

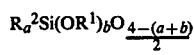

wherein
R$^1$ is a lower alkyl radical with up to 4 carbon atoms,
R$^2$ is an alkyl or phenyl group,
a=1.0 to 1.2, and
b=0.5 to 1.2,
with the proviso that at least 50 weight percent of the alkoxysiloxane is distillable at 1 to 15 mbar with siloxanes having the formula [R$^2$Si(OR$^1$)O]$_n$, wherein n is 3 to 8, being preferred,
with
(b) a polyol having the formula

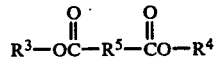

in which R$^3$ and R$^4$ are the same or different and represent the following groups

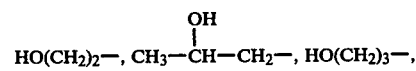

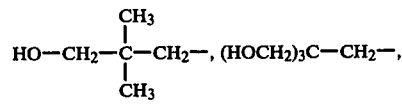

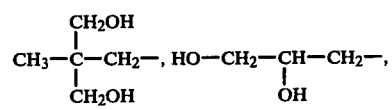

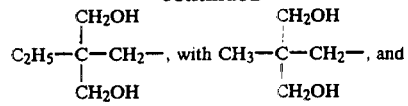

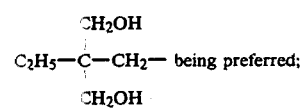

R$^5$ is an alkylene, cycloalkylene or phenylene group, with the proviso that the polyol contains at least three hydroxyl groups.

The alkoxysiloxane is reacted with the polyol to a degree of reaction not exceeding 70%, the reaction however being conducted sufficiently far, such that a clear solution is obtained. Preferably, the ratio of Si-OR$^1$/C—OH is 0.8 to 1.2.

DESCRIPTION OF THE PREFERRED EMBODIMENT

The alkoxysiloxane used for the reaction, can be synthesized by procedures well known to the art. Preferred polysiloxanes are those wherein at least 50 weight percent of the alkoxysiloxane correspond to the formula [R$^2$Si(OR$^1$)O]$_n$, in which n has a value of 3 to 8. At least a predominant portion, if not all, of the alkoxysiloxane used is of low molecular weight. It generally contains about 80 weight percent of portions which can be distilled at a reduced pressure of about 1 to 15 mbar. Such alkoxysiloxanes are formed, for example, by the hydrolysis and condensation of appropriate alkoxysilanes at temperatures of about 60° C.

It was surprising to those skilled in the art that, after alkoxysiloxanes of such low molecular weights are reacted with polyols, they can be crosslinked at a sufficient rate of curing.

R$^1$ is a lower alkyl group with 1 to 4 carbon atoms, which is linear or may be branched in the case of the higher number of carbon atoms. R$^2$ is an alkyl or phenyl group. The methyl group is preferred as the alkyl group. Particularly advantageous results are obtained if alkoxysiloxanes are used in which more than 5% of the number of R$^2$ groups are phenyl groups.

The polyol chosen for reaction with the alkoxysiloxane is important. These polyols are also of low molecular weight. The polyol may contain 3 to 6 hydroxyl groups. This means that only one of the groups R$^3$ and R$^4$ can represent the groups

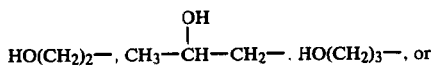

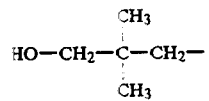

The two ester groups are linked together by a bivalent hydrocarbon bridge. The bridge is formed by the R$^5$ group, R$^5$ being an alkylene, cycloalkylene or phenylene group. If R$^5$ represents an alkylene group, this group preferably has 4 to 7 carbon atoms. Especially preferred are the 1,4- and 1,3-phenylene groups. The cyclohexylene group is preferred as the cycloalkyl group. Due to conditions related to the synthesis, oligomeric ester polyols of these compounds may also be contained in lesser amounts. In this connection, oligomeric ester polyols are defined as compounds in which the dicarboxylic acid unit occurs more than once.

The alkoxysilane and polyol are preferably reacted together in such amounts that the quotient $$\frac{SiOR^1}{COH} = 0.8$$

to 1.2. A quotient of about 1 is especially preferred.

The reaction of the reactants is carried out up to a maximum degree of conversion of about 70% and then terminated. The remainder of the conversion and the curing of the product take place on the surface to be coated. If a lower degree of conversion is selected, care must be taken to make certain that the reaction is carried out to an extent sufficient to produce a clear solution of the products in one another. This compatibility depends on the nature of the alkoxysiloxane and the polyol used. In general, starting materials and reaction products become mutually compatible at a conversion of about 40 to 50%. These solutions then also remain clear on cooling.

Transesterification of the alkoxysiloxanes and curing take place using catalysts. Titanate esters are known to be suitable for this purpose. They can also be used in the inventive process. An example of such a titanate ester is tetrabutyl titanate.

This catalyst can also be used for curing the product of the process during baking. It has, however, turned out that particularly advantageous properties of the baked coating are obtained when a compound, obtained by reacting 2 moles of a polyol having the formula

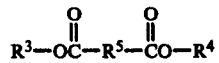

with 2 to 4 moles of phthalic or trimellitic anhydride and 1 mole of Ti(OR$^6$)$_4$, is added to the partial reaction product in amounts of 0.2 to 1.5 weight percent, based on the solid resin, as a curing catalyst. R$^3$, R$^4$ and R$^5$ have the meanings already given. Independently of the nature of the group, however, R$^3$ and R$^4$ may be same or different. However, the polyol which is reacted with the anhydride, must have at least one free OH group. In this connection, R$^6$ is an alkyl group with 1 to 6 carbon atoms. when using this reaction product as a catalyst, the storage stability of the resins, the crosslinking density of the baked resins, and their mechanical and chemical stabilities, especially in the presence of aqueous media, are increased. A further advantage of the catalyst is its good solubility in the partially reacted product of the alkoxysiloxane and the polyol.

The heat-curable silicone resins, produced by the inventive process, have the desired low viscosity. They can be brought into a ready-for-use form by small additions of conventional solvents, such as, for example, ethylene glycol acetate or xylene. In general, additions of 20% solvent, based on the non-volatile matter, are adequate. The inventively produced resins cure in about 30 minutes at temperatures of 200° C. If the temperature is raised to about 270° C., curing is accomplished within 5 to 10 minutes. The coatings obtained adhere well to metallic substrates, and can be stressed elastically and especially thermally. The resistance of the baked films to water and detergents is excellent, especially when the preferred catalyst is used.

The following examples illustrate the invention:

EXAMPLE 1

(a) Synthesis of Bis(2,2-dihydroxymethyl)butyl Terephthalate (BBT)

Dimethyl terephthalate (194 g, 1 mole), 268 g (2 moles of 2,2-dihydroxymethylbutan(1)ol (trimethylolpropane) are heated in a flask. When a temperature of 140° C. is reached, 0.5 g of magnesium acetate are added. The temperature is now raised steadily over a period of 3 hours to 240° C. During this time, 64 g (2 moles) of methanol are distilled off. The contents of the flask are cooled slowly and, when the temperature reaches 140° to 150° C., mixed with 100 g of diglycoldimethyl ether, after which they are cooled to room temperature.

The product has a non-volatiles content of 80% and an OH number of 560 mg KOH. Gel chromatographic analysis reveals that 30% of the product is an oligomeric ester polyol with more than one dicarboxylic acid unit in the molecule.

(b) Synthesis of a Phenylethoxypolysiloxane

Phenyltriethoxysilane (240 g, 1 mole) is mixed with catalytic amounts of hydrogen chloride and 100 g of anhydrous ethanol. The solution is heated with stirring to 60° C. At this temperature, a mixture of 162 g of ethanol and 18 g (1 mole) of water is added dropwise over a period of 30 minutes. The excess ethanol is subsequently distilled off under reduced pressure.

The polymer mixture has an average ethoxy content of 25%; 80% of the product can be distilled over at 180° C./2 torr, and this product has an ethoxy value of 27% and a molecular weight of 830. It therefore corresponds to the formula [C$_6$H$_5$—Si(OC$_2$H$_5$)O]$_5$.

(c) Reaction of BBT with the Phenylethoxypolysiloxane

Bis-(2,2-dihydroxymethyl)butyl terephthalate (120 g of an 80% solution, 1 mole C—OH) and 165 g of the phenylethoxypolysiloxane (100%; 0.9 moles of Si—OC$_2$H$_5$) are mixed with 30 g of monoethyl ethylene glycol acetate and 5 g of a 10% solution of tetrabutyl titanate in butyl acetate and heated to 135° C. Within a period of one half hour, 25 g of ethanol are distilled over (60% conversion). The product is cooled rapidly. It has a viscosity of 1,200 cSt at 25° C. at a non-volatiles content of 80% which is adjusted to this value with monoethyl ethylene glycol acetate. The product is colorless and completely clear.

(d) Synthesis of a Curing Catalyst

Bis-(2,2-dihydroxymethyl)butyl terephthalate (30 g of the 80% solution, 0.06 moles) is mixed with 18 g of diglycoldimethyl ether and heated to 130° C. Phthalic anhydride (13.3 g, 0.09 moles) is dissolved in this solution, which is then cooled and slowly added dropwise to a solution of 10 g (0.03 moles) of tetrabutyl titanate, dissolved in 8 g of diglycoldimethyl ether and heated to 130° C. Butanol is distilled off during the dropwise addition. Immediately after the addition, the amount of distillate is 7 g, of which 3.9 g is butanol. Theoretically, this corresponds to a 45% conversion. The product is cooled down.

(e) Testing the Application

The silicone resin (100 g portions) synthesized in (c) is mixed with:

(1) 0.5 g of the curing catalyst synthesized in (d) or
(2) 0.7 g of a 10% solution of tetrabutyl titanate in monobutyl ethylene glycol and pigmented with 80 g of titanium dioxide.

The paints are applied onto aluminum test panels (Bonder 1401 AL) with a doctor blade and, after exposure in air for 10 minutes, cured in an oven for 10 minutes at 270° C. The coating thickness is 30 to 35 $\mu$m.

The following test results were obtained:

|  | 1 | 2 |
|---|---|---|
| Thermoplasticity Wolff-Wilborn Pencil Hardness |  |  |
| at 20° C. | 3 H | 2 H |
| at 150° C. | 3 H | H B |
| Yellowing according to Hunter Lab. b-value of sample |  |  |
| at zero time | −1.2 | −1.2 |
| after 3 hours at 300° C. | +0.8 | +0.9 |
| Detergent Resistance (test panels suspended for 3 hours in 3% detergent solution) | no attack | slight attack (slight loss of gloss) |

The thermoplasticity and detergent resistance of the coating, cured with the inventive catalyst, is clearly better. As expected, yellowing is the same in both cases.

The above-described coatings are repeated and cured under coil-coating conditions (an oven temperature of 265° C. for 60 seconds). The MEK resistance of both test panels is in excess of 200 double lifts. In both cases, the flexibility according to the ECCA standard is 2 T. This clearly shows that the inventive catalyst leads to better properties for ultimate use but not to a lower flexibility as would be expected in view of the higher crosslinking density.

EXAMPLE 2

An ethoxy-functional methylphenylpolysiloxane with a molar methyl:phenyl ratio of 2 and an R:Si ratio of 1 is synthesized as in Example 1. The polymer mixture has an ethoxy content of 32.5%. 75 percent of the product can be distilled under reduced pressure and has an ethoxy value of 36%; this corresponds to the following formula: $[(CH_3)_{0.67}(C_6H_5)_{0.33}Si(OC_2H_5)O]_n$.

The molecular weight is 680, from which a value of 5.5 is obtained for n.

The methylphenylpolysiloxane is reacted with a polyol, synthesized as in Example 1(a) from 194 g (1 mole) of dimethyl isophthalate and 240 g (2 moles) of 2,2-dimethylolpropan(1)ol (trimethylolethane). The 80% solution has a viscosity of 2,000 cSt at 25° C. and is mixed with 0.5 g of the curing catalyst, synthesized in Example 1(d), filtered and tested as described in Example 1(e).

The test results are:

| Wolff-Wilborn Hardness |  |
|---|---|
| at 20° C. | 3 H |
| at 150° C. | 3 H |
| Detergent test (3 hours) | slight attack, slight loss of gloss |
| Yellowing (b values) |  |
| at zero time | −1.2 |
| after 3 hours at 300° C. | −2.0 |

EXAMPLE 3

An ethoxy-functional methylpolysiloxane (124 g) with a methyl:silicon ratio of 1, an ethoxy content of 40% and a distillable portion of 75%, is reacted as in Example 1(c) with 115.6 g of bis-(2,2-dihydroxymethyl)propyl terephthalate (80% solution in diglycoldimethyl ether, synthesized from dimethyl terephthalate and 2,2-dihydroxymethylpropan(1)ol (trimethylolethane) in a molar ratio of 1:2). The conversion, calculated from the amount of ethanol distilled over is 55%; the concentration of the product is adjusted with monoethyl ethylene glycol acetate to 80% non-volatiles and the solution has a viscosity of 1800 cSt at 25° C.

Testing was carried out as described in Example 1(e) and gave the following results:

| Wolff-Wilborn Hardness |  |
|---|---|
| at 20° C. | 1 H |
| at 150° C. | 2 H |
| Detergent Resistance (after 3 hours) | slight attack, severe loss of gloss |

EXAMPLE 4

(Compariaon Example, not in accordance with the invention)

A phenylmethoxypolysiloxane (150 g) whose composition corresponds to the formula

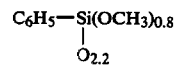

and which has a viscosity of 1,500 cSt at 25° C., as well as an average molecular weight of 1,200 and only 45% distillables, is reacted with a polyester (150 g), which is synthesized from 194 g (1 mole) of dimethyl terephthalate and 95 g (0.7 moles of 2,2-dihydroxymethylbutan(-1)ol (trimethylolpropane) and 27.6 g (0.6 mole) of ethylene glycol. The OH number of the polyester is 320 mg KOH. Gel chromatographic analysis revealed that 80% of the product consists of oligomeric ester polyols with more than one dicarboxylic acid unit in the molecule. On the average, the product contains 3.3 dicarboxylic acid units per molecule. The reaction is carried out as described in Example 1(c). The concentration of the product is adjusted with monoethyl ethylene glycol acetate to 60% non-volatiles and the solution has a viscosity of 1,200 cSt at 25° C.

The silicone resin (100 g) is mixed with 0.7 g of a 10% solution of tetrabutyl titanate in monobutyl ethylene glycol and pigmented with 60 g of titanium dioxide.

Testing is carried out as described in Example 1(e). The test results are:

| Wolff-Wilborn Hardness |  |
|---|---|
| at 20° C. | 3 H |
| at 150° C. | F—H |
| Detergent Resistance | slight attack (loss of gloss) |

| -continued | |
|---|---|
| Yellowing | |
| at zero time | −1.2 |
| after 3 hours at 300° C. | +0.9 |

In comparison to Example 1 in which a pure phenylalkoxysiloxane was also used, the coating is observed to have a high thermoplasticity as well as only slight resistance to detergents.

We claim:

1. A process for the synthesis of a heat-curable silicone resin which is soluble in organic solvents comprising partially reacting in the presence of a catalyst:

(a) an alkoxysiloxane having the formula

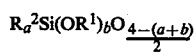

wherein $R^1$ is a lower alkyl radical with up to 4 carbon atoms, $R^2$ is an alkyl or phenyl group, a=1.0 to 1.2, and b=0.5 to 1.2, with the proviso that at least 50 weight percent of the alkoxysiloxane can be distilled at 1 to 15 mbar; with (b) a low molecular weight polyol having the formula

in which $R^3$ and $R^4$ are the same or different and represent the following groups:

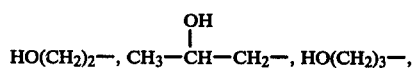

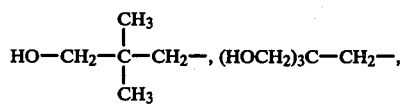

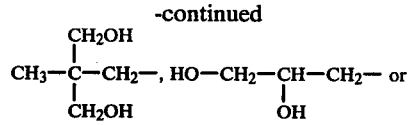

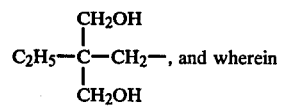

$R^5$ is an alkylene, cycloalkylene or phenylene group;

with the proviso that the polyol contains at least three hydroxyl groups, the alkoxysiloxane being reacted with the polyol to a degree of reaction not exceeding 70% but being carried out sufficiently far to produce a clear solution.

2. The process of claim 1 wherein the alkoxysiloxane has the formula $$[R^2Si(OR^1)O]_n$$

wherein n is from 3 to 8.

3. The process of claim 1 wherein alkoxysiloxanes and the polyols are used in amounts such that the quotient

is from 0.8 to 1.2.

4. The process of claim 1 wherein more than 5% of the number of $R^2$ groups are phenyl groups.

5. The process of claim 1 wherein $R^5$ is a 1,4- or a 1,3-phenylene group.

6. The heat-curable resin produced by the process of claim 1.

7. The heat-curable resin produced by the process of claim 2.

8. The heat-curable resin produced by the process of claim 3.

9. The heat-curable resin produced by the process of claim 4.

10. The heat-curable resin produced by the process of claim 5.

11. In a coating material composed of a vehicle and a pigment, the improvement which comprises said vehicle being the resin of claim 6.

12. A substrate coated with the cured resin of claim 6.

* * * * *